Figure 1:
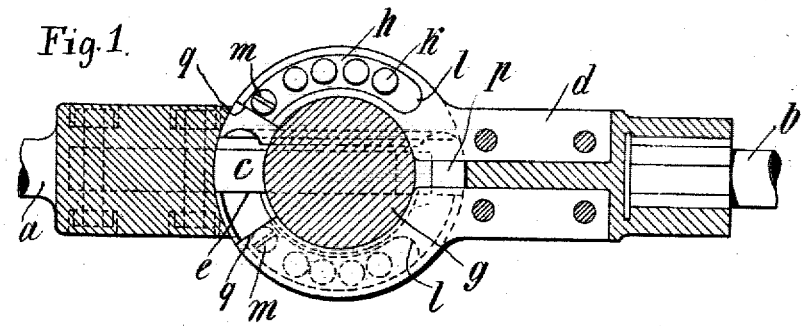

No. 826,606. PATENTED JULY 24, 1906.
W. VON PITTLER.
BALL AND SOCKET JOINT.
APPLICATION FILED NOV. 21, 1905.

UNITED STATES PATENT OFFICE.

WILHELM VON PITTLER, OF BERLIN, GERMANY.

BALL-AND-SOCKET JOINT.

No. 826,606.  Specification of Letters Patent.  Patented July 24, 1906.

Application filed November 21, 1905. Serial No. 288,425.

*To all whom it may concern:*

Be it known that I, WILHELM VON PITTLER, engineer, a subject of the King of Prussia, German Emperor, residing at Berlin, in the Kingdom of Prussia, in the Empire of Germany, have invented certain new and useful Improvements in Ball-and-Socket Joints, of which the following is a full, clear, and exact specification.

My invention relates to and has for its object ball-and-socket joints in which U-shaped pieces or bows at right angles to one another grip a spherical connecting-piece, so that each bow drives or is driven by the other, respectively.

Ball-and-socket joints are well known which are provided with two U-shaped pieces or bows having a transverse section approximately square placed at right angles to one another. These bows grip in places cut away or grooves in a spherical connecting-piece, and each is caused to revolve with and communicate its motion to or be driven by the other. In the manufacture of ball-and-socket joints these bows are fitted exactly into the spherical connection-piece, so that they take up a concentric position with regard to their connecting-piece in each position into which the shafts are rotated. One of the great objections to ball-and-socket joints of this kind, however, is that as soon as such a ball-and-socket joint transmits power by being revolved wearing takes place on the inner surfaces of each bow and the surfaces of the respective grooves provided in the connecting-piece which are in contact with one another. In consequence the bows are no longer held in a concentric position with regard to the spherical connecting-piece, and therefore shocks arise when power is transmitted, which easily lead to a fracture and giving way of the parts of the joint.

One of the important objects of my invention is, therefore, to assure that the concentric position of the bows with regard to the central connecting-piece is always maintained in a ball-and-socket joint of the above-described kind. I attain this purpose in my new ball-and-socket joint by arranging balls between the sliding faces of the bows, through which power is transmitted, and the sliding faces of the connecting-piece, which faces can slide relatively to one another. The concentric position in my improved ball-and-socket joint is guaranteed, owing to the balls being always held by means of the working pressure in the deepest part of the grooves, which in transverse section are curved and are for the reception of the balls, and the shape of the grooves, which in transverse section is curved, is always retained in the wear-and-tear of the grooves.

Another object of my invention is to reduce the friction between the bows and the connecting-piece, which is attained in consequence of the arrangement of the balls in a ball-and-socket joint of the above-described kind.

The accompanying drawings illustrate a ball-and-socket joint embodying my invention.

Figure 2:
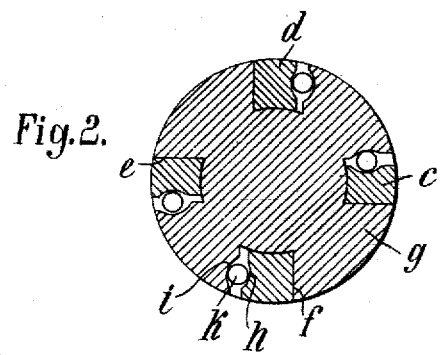
Figure 3:
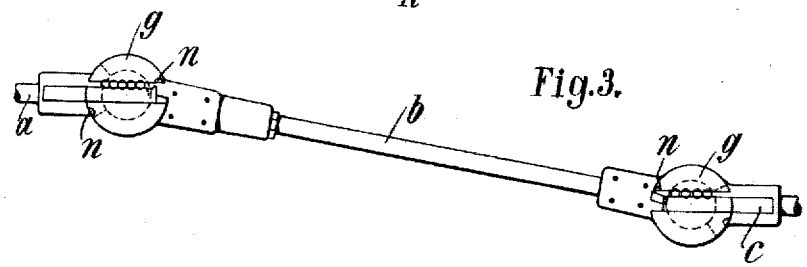
Figure 4:
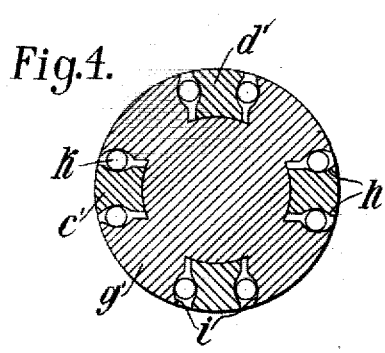

Figure 1 is a longitudinal section through the joint. Fig. 2 is a transverse section through the joint. Fig. 3 shows the connection of two shafts by means of two joints and an intermediate shaft. Fig. 4 shows another method of constructing the joint.

Similar letters of reference refer to similar parts in all views.

Both the shafts $a\,b$, Fig. 1, to be joined to one another are provided with two-part bows $c\,d$, which are able to slide in cuts or channels $e\,f$, placed at ninety degrees from one another in a spherical connecting-piece $g$. In the example shown in Figs. 1 and 2, in which the shafts $a\,b$ revolve in one direction only, a side face of the parts of the bow which clasp round the connecting-piece $g$ is provided with a groove $h$, and likewise each opposing face of the channels $e\,f$ of the connecting-piece $g$ is provided with a similar groove $i$. These grooves $h\,i$ are on those faces through which the power is transmitted. Balls $k$ are arranged between the grooves $h\,i$, which balls are held in their position on the one hand by means of the end $l$, Fig. 1, of the grooves $h$ and on the other hand by means of the set-screws $m$. It is better that the balls $k$ do not perfectly fill the grooves $h$, as shown in Fig. 1, so that they are not able to get jammed at the ends $l$ of the grooves. On account of the centrifugal force the balls $k$ are held in the position as shown in Fig. 1. The part cut away or cavity $n$ in the connecting-piece $g$ allows the set-screws $m$ to be taken out and the balls $k$ to be changed.

When being worked, the balls are held in the deepest part of the grooves $h\,i$, which are curved in transverse section by means of the working pressure, so that the concentric position of the bows $c\,d$ with regard to the connecting-piece $g$ is always observed, and the shape of the grooves, which in transverse section is curved, is retained in the wearing of the grooves.

Fig. 3 shows the connection of two shafts $a$ with their axes lying parallel to one another revolving in one direction only by means of two ball-and-socket joints of the above-described kind and an intermediate shaft $b$.

In the example shown in Fig. 4 balls $k$ are arranged on both sides of the bows $c''d'$ between these bows and the connecting-piece $g'$. This arrangement is suitable for the case when the shafts $a$ $b$ revolve in an optional direction.

The shape of the grooves, which in transverse section is curved, may be already provided in manufacture or first be formed by wear and tear.

The ends $q$, Fig. 1, of the two-part bows $c$ and $d$ may also be in contact or fit over one another. In this case a correspondingly-larger space at $p$ must be provided between the two parts of each bow in order not to prevent the turning of the bows.

Having thus described my invention, I claim as new and desire to secure by Letters Patent—

1. In a ball-and-socket joint, the combination of a substantially spherical connecting-piece, two bows therein disposed substantially at right angles to each other, and balls between the power-transmitting faces of the bows and the corresponding faces of the connecting-piece.

2. In a ball-and-socket joint, the combination of a substantially spherical connecting-piece, two bows therein disposed substantially at right angles to each other, and balls between the power-transmitting faces of the bows and the corresponding faces of the connecting-piece, the faces of the connecting-piece or bows having grooves to retain the balls.

3. In a ball-and-socket joint, the combination of a substantially spherical connecting-piece, two bows therein disposed substantially at right angles to each other, and balls between the power-transmitting faces of the bows and the corresponding faces of the connecting-piece, the faces of the connecting-piece having grooves curved in cross-section to retain the balls.

4. In a ball-and-socket joint, the combination of a substantially spherical connecting-piece, two bows therein disposed substantially at right angles to each other, and balls between the power-transmitting faces of the bows and the corresponding faces of the connecting-piece, said connecting-piece being cut away to permit the removal of the balls.

In testimony whereof I have signed my name to this specification in the presence of two subscribing witnesses.

WILHELM VON PITTLER.

Witnesses:
 JOHANNES HEIN,
 HENRY HASPER.